(12) United States Patent
Tong

(10) Patent No.: US 9,969,324 B2
(45) Date of Patent: May 15, 2018

(54) VEHICLE COVER DECORATION STRIP

(71) Applicant: NINGBO ZHONGXIN ELECTRONIC TECHNOLOGY CO., LTD., Ningbo (CN)

(72) Inventor: Mingkui Tong, Shaoxing (CN)

(73) Assignee: Ningbo Zhongxin Electronic Technology Co., Ltd., Ningbo (CN)

( * ) Notice: Subject to any disclaimer, the term of this patent is extended or adjusted under 35 U.S.C. 154(b) by 0 days. days.

(21) Appl. No.: 15/286,994

(22) Filed: Oct. 6, 2016

(65) Prior Publication Data

US 2018/0037159 A1    Feb. 8, 2018

(30) Foreign Application Priority Data

Aug. 4, 2016 (CN) .......................... 2016 1 0642315

(51) Int. Cl.
*B60Q 1/32* (2006.01)
*B60Q 1/46* (2006.01)
*B60Q 1/26* (2006.01)
*F21S 8/10* (2006.01)
*F21Y 115/10* (2016.01)

(52) U.S. Cl.
CPC ............. *B60Q 1/46* (2013.01); *B60Q 1/2615* (2013.01); *F21S 48/215* (2013.01); *F21S 48/22* (2013.01); *F21Y 2115/10* (2016.08)

(58) Field of Classification Search
CPC .......... F21S 48/31; F21S 48/332; F21S 45/10; F21S 45/30; F21S 45/37; B60Q 1/46; B60Q 1/2615; B60Q 1/32; B60Q 1/323; B60Q 1/2669; F21V 31/00; B60R 13/04; B60R 13/07
See application file for complete search history.

(56) References Cited

U.S. PATENT DOCUMENTS 6,866,398 B2 * 3/2005 Lin ........................... F21S 4/24
                                                            362/244
6,994,621 B2 * 2/2006 Mashiko ................. F21V 31/03
                                                            362/345
7,018,079 B1 * 3/2006 Franco-Vila ............. A62B 1/20
                                                            362/253

(Continued)

FOREIGN PATENT DOCUMENTS

CN          2666741 Y       12/2004

OTHER PUBLICATIONS

English abstract of CN 2666741 (Y) which is Chinese Application 03279480.0.

*Primary Examiner* — Peggy Neils
(74) *Attorney, Agent, or Firm* — Ladas & Parry LLP

(57) ABSTRACT

The invention discloses a vehicle cover decoration strip comprising a decoration strip body (1) connected to a vehicle cover, the decoration strip body (1) is provided with a placing board (2), and the placing board (2) is at least provided with a lighting device (3) downward irradiating a vehicle head. In a process of driving at night, by projecting light on the vehicle head through the lighting device, the light forms reflection on the vehicle head, such that 1, a good decoration effect is achieved for the vehicle, and 2, a good warning effect is achieved, a driver from the opposite side can better observe a distance from a self vehicle to the opposite vehicle, and a phenomenon of scraping is avoided.

7 Claims, 5 Drawing Sheets

(56) References Cited

U.S. PATENT DOCUMENTS

| | | | |
|---|---|---|---|
| 7,051,464 B2* | 5/2006 | Kwon | B63B 45/04 |
| | | | 362/217.12 |
| 7,845,828 B2* | 12/2010 | Ku | F21V 29/004 |
| | | | 257/98 |
| 9,291,330 B2* | 3/2016 | Yang | F21V 3/02 |
| 9,481,296 B2* | 11/2016 | Roberts | B60Q 1/2615 |
| 2011/0255276 A1* | 10/2011 | Coward | F21V 14/02 |
| | | | 362/217.02 |
| 2017/0210342 A1* | 7/2017 | De Wind | B60R 25/241 |

* cited by examiner

VEHICLE COVER DECORATION STRIP

FIELD OF THE INVENTION

The present invention relates to a vehicle decoration part, and more particularly, relates to a vehicle cover decoration strip

BACKGROUND OF THE INVENTION

Along with increasing improvement of people's living standard, the demand on vehicles is greater and greater. People not only pay attention to the quality and modeling inside the vehicles, but also more and more pursue individuation on decoration of vehicle's appearances. However, due to the acceleration of pace of life, people unwillingly spend too much time on installation of a vehicle surface ornament that can be mounted by only a complex procedure or special tool.

For example, the patent CN03279480.0 discloses a vehicle cover decoration strip, which is fixed on a vehicle cover to achieve a better decoration action, and the connection between the decoration strip and the vehicle cover is also very firm.

However, along with continuous improvement of people's living standard, basically, every family will purchase a vehicle, and at night, as the safety accidents caused by the vehicles are more and more, the decoration strip simply having the decoration action cannot meet the demands of people well.

SUMMARY OF THE INVENTION

An objective of the present invention is to provide a vehicle cover decoration strip capable of achieving a good warning action at night.

The above technical objective of the present invention is realized by the following technical solution: a vehicle cover decoration strip comprises a decoration strip body connected to a vehicle cover, wherein the decoration strip body is provided with a placing board, and the placing board is at least provided with a lighting device downward irradiating a vehicle head.

By the above arrangement, when the decoration strip is mounted on a vehicle, the lighting device can be connected to a control system of the vehicle, the control system controls the lighting device to work, and the lighting device downwards irradiates light to the vehicle head, such that at night, even if a headlamp of the vehicle is damaged, people can still see the vehicle from a very far place, thereby ensuring the driving safety of the vehicle; in the meantime, when two vehicles are about to pass by each other, if both parties open the headlamps, great influence on implementation of the two parties is caused, and the safety accident occurs, but through projecting the light on the vehicle head by the lighting device, when the two vehicles pass by each other, the two parties can turn off the headlamps at first, the distance from the vehicle of the opposite party can be conveniently adjusted by the working of the lighting device, thereby effectively avoiding the safety accidents when the two vehicles pass by each other; the lighting device projects light to the vehicle head, and the color of the light irradiated by the lighting device can also be adjusted, thereby achieving a good decoration effect for the vehicle.

Preferably, the placing board comprises a plurality of mounting boards for mounting the lighting device and drain tanks located between every two adjacent mounting boards, and one ends of the drain tanks back onto the decoration strip body are openings.

Through the above arrangement, in a process of driving the vehicle on rainy days, some rainwater will enter the placing board, as the lighting device is placed on the placing board, if the rainwater is accumulated on the placing board for a long time, the rainwater will generate an influence on the normal working of the lighting device, while due to the existence of the drain tanks, since the vehicle needs to be frequently turned right and left in an advancing process, the rainwater located on the mounting boards will flow leftward or rightward due to inertia and can further flow into the drain tanks, and along with an acceleration process of the vehicle, this part of rainwater flows to the tank openings of the drain tanks, and is thus drained from the tank openings of the drain tanks. The above structure can effectively prevent the rainwater from being accumulated on the placing board.

Preferably, the bottoms of the drain tanks are obliquely disposed and the depth of the drain tanks with respect to one end of the placing board is smaller than the depth of the opening ends of the drain tanks.

Through the above arrangement, when the rainwater flows into the drain tanks, since the bottom surfaces of the drain tanks are obliquely disposed, the rainwater in the drain tanks will slide to the direction of the tank openings due to a gravity action per se and can fast flow out along the bottom surfaces of the drain tanks, thereby effectively improving the draining efficiency of the drain tanks.

Preferably, the joints between the mounting boards and the decoration strip body are provided with transition portions of which the bottoms are in smooth connection to the bottoms of the drain tanks.

Through the above arrangement, in a process that the vehicle is turned left or right, as the driving speed needs to be reduced in the turning process and at this point, the rainwater located on the mounting board will move to the transition portions due to the inertia action per se, afterwards, the vehicle begins to turn left or right, at this moment, the rainwater on the mounting board will move rightwards or leftwards again due to the inertia action per se, and since the bottoms of the transition portions are in smooth connection to the bottoms of the drain tanks, the rainwater can fast flow to the bottom surfaces of the drain tanks and then flow out via the bottom surfaces of the drain tanks, the residual rainwater on the side walls of the drain tanks moves to the transition portions as the vehicle stops and then flows to the bottoms of the drain tanks via the transition portions, while the residual rainwater on the bottoms of the drain tanks can be drained out of the drain tanks by a starting and accelerating process of the vehicle; if no transition portions exist, the rainwater will flow to the side walls of the drain tanks firstly and then flows to the bottoms of the drain tanks via the side walls of the drain tanks, in this process, the rainwater slowly slides down by depending on the gravity per se, as a result, part of rainwater is residual for a long time, and causes corrosion to the whole mounting board. To sum up, due to the transition portions, the draining speed of water flows on the mounting board is quickened, the water flows are prevented from being accumulated on the mounting board to corrode the mounting board and the service life of the mounting board is prolonged.

Preferably, the lighting device comprises bottom boards allowing light to transmit through, cover bodies covering the bottom boards and LED lamps between the cover bodies and the bottom boards, and the bottom boards are concave downward to form grooves for placing the LED lamps.

Through the above arrangement, the LED lamps are covered by the cover bodies, thereby effectively avoiding the exposure of the LED lamps to the outside and achieving a good protection action for the LED lamps, due to the grooves, the LED lamps can be well located, the positions of the LED lamps on the bottom boards are well limited, the LED lamps are prevented from shaking in the cover bodies and the service life of the LED lamps is prolonged.

Preferably, press boards are disposed in the cover bodies, which abut the LED lamps in the grooves by the press boards.

Through the arrangement, when the LEDs are damaged and need to be replaced, the height of the LED lamp purchased from the market may be larger or smaller, and then the LED lamp cannot be mounted in or shakes in the cover body; the cover bodies press the LED lamps by the press boards, therefore, when the replaced LED lamp is higher or lower than the previous LED lamps, only one press board with a different thickness needs to be replaced without the need to seek an adaptive LED lamp everywhere, when a plurality of LED lamps are in the cover bodies, the press boards can be set to be conductive boards, the press boards are in contact angle connection to the LED lamps, only the press boards need to be powered on when the LED lamps are lighted, and the whole line is simple to arrange.

Preferably, the bottom boards are provided with first ridges extending to form closing structures along the edges of the cover bodies and capable of abutting against the inner walls of the cover bodies.

Through the above arrangement, due to the first ridges, when the cover bodies are disposed on the bottom boards, the inner walls of the cover bodies abut against the side walls of the first ridges, thereby realizing precise location of the positions of the cover bodies and preventing the cover bodies from being deviated; in the use process of the decoration strip, no shake phenomenon exists between the cover bodies and the bottom boards; in addition, by abutting the first ridges against the cover bodies, the airtightness between the cover bodies and the bottom boards can be increased and some rainwater is prevented from permeating into the cover bodies.

Preferably, second ridges extending to form closed structures along the edges of the first ridges are disposed on the bottom boards, the second ridges are located between the first ridges and the LED lamps and gaps exist between the first ridges and the second ridges.

By the above arrangement, when the rainwater permeates into the cover bodies, the second ridges will block the rainwater to some degree, and prevent the rainwater from flowing to the LED lamps; due to the gaps, part of rainwater permeating into the cover bodies is stored in the gaps, the phenomenon that massive water flows flow to the LED lamps and damages the LED lamps is prevented and the service life of the LED lamps is prolonged.

Preferably, the second ridges are higher then the first ridges and the sectional shapes of the first ridges along the height direction thereof are triangular.

By the above arrangement, when the rainwater permeates into the cover bodies, part of rainwater exists between the first ridges and the cover bodies, and due to this part of rainwater, the rainwater outside the cover bodies will be blocked from entering the cover bodies to some degree; meanwhile, in a process that the vehicle is turned left, the rainwater between the first ridges and the second ridges flows to the positions between the first ridges and the cover bodies along the slopes of the first ridges, such that 1, a part of water flows out and 2, the water flows outside the cover bodies is prevented from flowing into the cover bodies; the second ridges are higher than the first ridges, so when a large number of water enters the cover bodies, it is ensured that the rainwater exists between the first ridges and the cover bodies all the time, thereby blocking the rainwater from entering to some degree.

Preferably, the decoration strip body comprises an arc connecting board and a fixing board attached to the vehicle cover, the fixing board and the placing board are respectively fixedly disposed at two ends of the connecting board and are located at the same side of the connecting board, and a projection of the connecting board on the plane where the placing board is can cover the placing board.

Through the above arrangement, since the fixing board and the vehicle cover are attached, a larger sealing area exists between the fixing board and the vehicle cover, and the rainwater on the vehicle cover is effectively prevented from flowing onto the placing board by the connecting board; if the rainwater flows onto the arc board by the vehicle cover and the fixing board, part of rainwater directly falls off due to its gravity action and part of the falling rainwater will fall outside the placing board, thereby effectively reducing the accumulation volume of the rainwater on the placing board.

In conclusion, the present invention has the following beneficial effects:

1. By projecting the light on the vehicle head through the lighting device, a good warning effect for the vehicle driving at night is achieved and a good decoration effect for the vehicle is also achieved.

2. In the driving process, the rainwater on the mounting board can fast flow to the bottoms of the drain tanks by the transition portions and can be fast drained.

3. Due to the first ridges and the second ridges, it is ensured that not too much rainwater can enter the cover bodies, the LED lamps are prevented from being soaked in water and the service life of the LED lamps is prolonged.

Reference signs: 1, decoration strip body; 11, fixing board; 111, threaded hole; 12, connecting board; 2, placing board; 21, drain tank; 22, mounting board; 221, light transmitting hole; 3, lighting device; 31, cover body; 32, bottom board; 321, groove; 4, press board; 5, LED lamp; 6, first ridge; 7, second ridge; 8, transition portion; 9, gap; 10 bulge.

DETAILED DESCRIPTION OF THE INVENTION

The present invention is further explained in detail in combination with the drawings.

Figure 1:
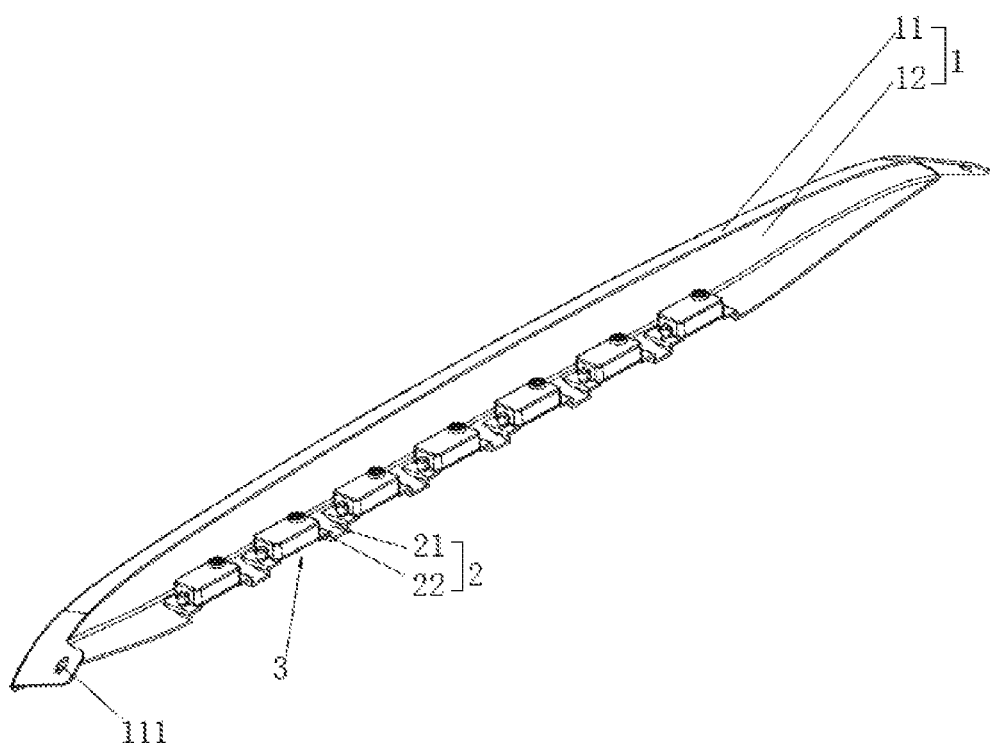
FIG. 1 is an axial view of the present embodiment.

A vehicle cover decoration strip, referring to FIG. 1, comprises a decoration strip body 1 and a placing board 2, wherein the decoration strip body 1 comprises an arc connecting board 2 and a fixing board 11 attached to the vehicle cover, a projection of the connecting board 12 on the placing board 2 can cover the whole placing board 2, two ends of the connecting board 12 are respectively connected to the fixing board 11 and the placing board 2, which are located at the same side of the connecting board 12, the fixing board 11 is provided with threaded holes 111 and the fixing board can be fixedly connected to the vehicle cover by screws inserted into the threaded holes 111. Of course, other manners can be used to fix the fixing board 11 with the vehicle cover, for example, a double-face adhesive tape is disposed on the side wall of the fixing board 11.

Figure 2:
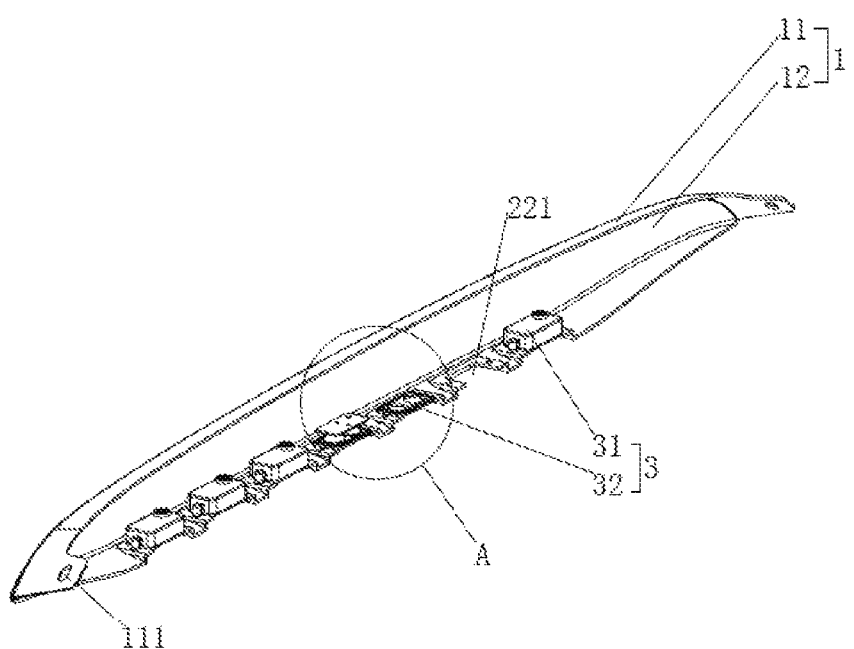
FIG. 2 is a structural diagram in which cover bodies and LED lamps are hidden in the present embodiment.
Figure 3:
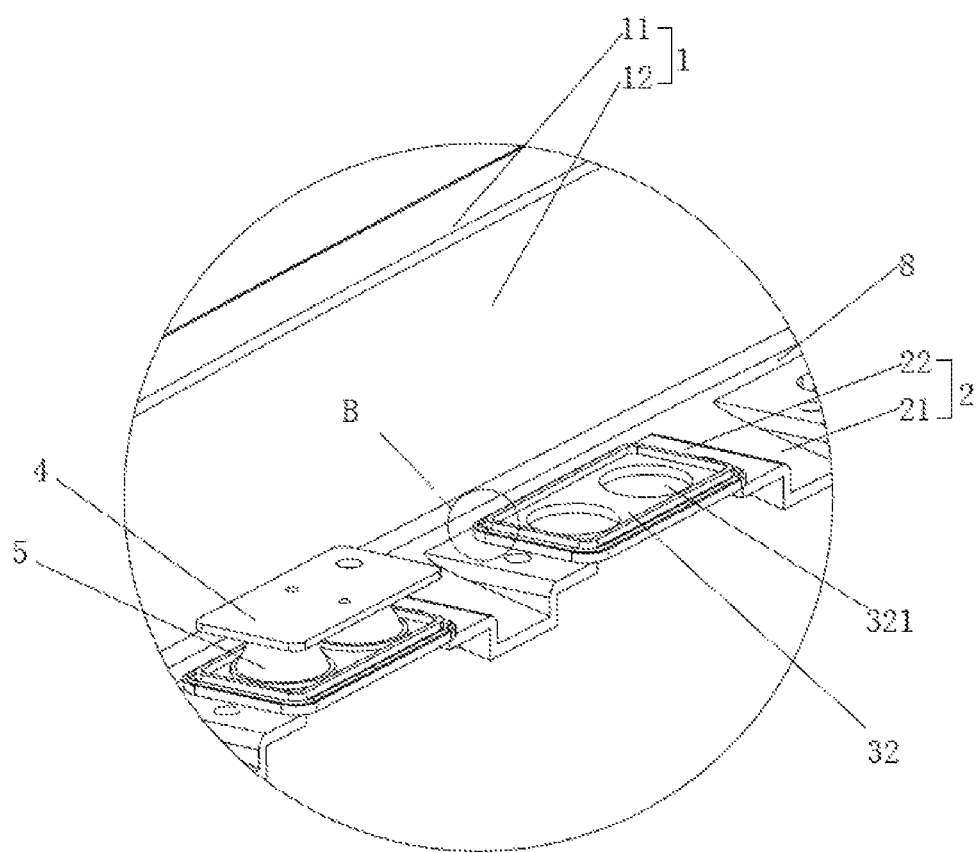
FIG. 3 is an enlarged view of an A portion in FIG. 2 and is used for embodying press boards and grooves.

Referring to FIGS. 2-3, the placing board 2 comprises a plurality of mounting boards 22 and drain tanks 21, wherein, one drain tank 21 exists between every adjacent two mounting boards 22, one ends of the drain tanks 21 back onto the connecting board 12 are openings, the bottom surfaces of the drain tanks 21 are obliquely downward disposed from the ends thereof connected to the connecting board 12, in fact, the mounting boards 22 are formed by upwards punching the placing board 2, correspondingly, the drain tanks 21 are formed between the adjacent two mounting boards 22, the mounting boards 22 are obliquely disposed, the oblique direction of the mounting boards 22 is just opposite to that of the bottom surfaces of the drain tanks 21, the joints between the mounting boards 22 and the connecting board 12 are provided with transition portions 8 of which the bottom surfaces are in smooth connection to the bottom surfaces of the drain tanks 21, i.e., no steps exist between the bottom surfaces of the transition portions 8 and the bottom surfaces of the drain tanks 21.

Referring to FIG. 3, one ends of the mounting boards 22 opposite to the fixing board 11 are provided with a lighting device 3, the lighting device 3 is fixedly connected to the mounting boards 22 by screws, and of course, can be fixedly connected to the mounting boards 22 in other manners, for example, the lighting device 3 is provided with clamping blocks, the mounting boards 22 are provided with clamping slots, and the lighting device 3 is fixed by matching the clamping blocks and the clamping slots. In order to facilitate the transmission of light of the lighting device 3, the mounting boards 22 are provided light transmitting holes 221 allowing the light to transmit through.

Figure 4:
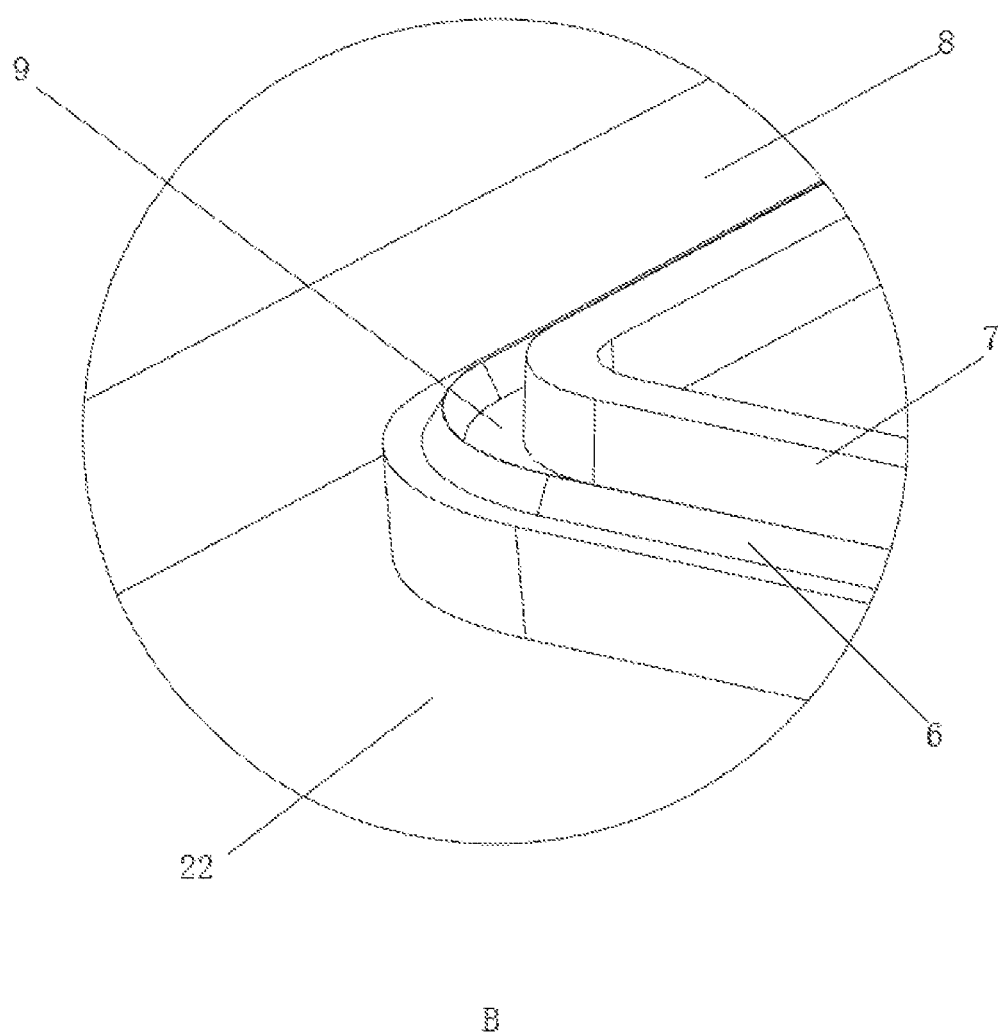
FIG. 4 is an enlarged view of a B portion in FIG. 2 and is used for embodying first ridges and second ridges.
Figure 5:
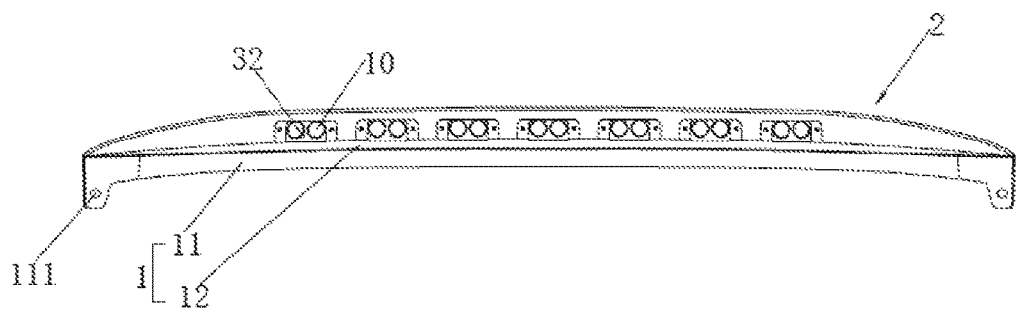
FIG. 5 is a structural diagram of the present embodiment and is used for embodying a relation between a connecting board and a placing board.

Referring to FIG. 3 and FIG. 4, the lighting device 3 comprises bottom boards 32 allowing light to transmit through, cover bodies 31 disposed on one ends of the bottom boards 32 opposite to the fixing board 11 and LED lamps 5 disposed in the cover bodies 31, wherein the bottom boards 32 are placed on the mounting boards 22, the cover bodies 31 are connected to the mounting boards 22 by screws, the cover bodies 31 are abutted against the mounting boards 22 and are made of a transparent material. As shown in FIG. 3, the upper end surfaces of the bottom boards 32 are downwards punched to form grooves 321, correspondingly, the lower end surfaces of the bottom boards 32 form bulges 10, light emitting ends of the LED lamps 5 are disposed in the grooves 321 and the LED lamps 5 downwards irradiate, the cover body 31 in the present embodiment is internally provided with two LED lamps 5, and then correspondingly, the bottom boards 32 are punched to form two grooves 321. The upper end surfaces of the bottom boards 32 are also provided with first ridges 6 and second ridges 7, wherein the first ridges 6 are closed geometries formed by extending along the edges of the cover bodies 31, for example, when the edges of the cover bodies 31 are rectangular, then the first ridges 6 are rectangular, the side walls of the first ridges 6 back onto one sides of the LED lamps 5 can abut against the cover bodies 31, the sectional shapes of the first ridges 6 along the height direction thereof are triangular, the second ridges 7 are disposed between the first ridges 6 and the LED lamps 5, the shapes of the second ridges 7 are approximate to those of the first ridges 6, and gaps 9 exist between the first ridges 6 and the second ridges 7 which are higher than the first ridges 6. As a preferable solution, the height of the second ridges 7 is twice that of the first ridges 6, such that the second ridges 7 can better block rainwater.

Referring to FIG. 3, press boards 4 are disposed between the cover bodies 3 and the LED lamps 5, the cover bodies 31 abut the light emitting ends of the LED lamps 5 in the groves 321 by the press boards 4, the press boards 4 can be made of a conductive material, the cover bodies 31 are made of an insulating material, the press boards 4 are connected to contacts of two LED lamps 5, such that when the two LED lamps 5 need to emit light, only the press boards 4 need to be powered on.

Use process: when the present decoration strip is mounted, firstly, the fixing board 11 is attached to the vehicle cover, then the fixing board 11 is fixed on the vehicle cover by screws, then the LED lamps 5 are powered on, the light of the LED lamps 5 will irradiate the vehicle head, thereby achieving a good warning action at night and also achieving a good decoration effect; meanwhile, since the mounting boards 22 are obliquely disposed, at this moment, the light of the LED lamps 5 obliquely irradiates the vehicle head, and when the light irradiates the vehicle head, a reflection angle of certain angle is formed on the vehicle head, such that people can observe the vehicle from a distant place.

On rainy days, a large part of rainwater flows downwards along the vehicle cover, at this point this part of rainwater flows to the joints between the fixing board 11 and the vehicle cover, due to a larger contact area between the fixing board 11 and the vehicle cover, the difficulty that the rainwater penetrates the space between the fixing board 11 and the vehicle cover is increased. But on stormy weathers and such, still part of rainwater will penetrate the space between the fixing board 11 and the vehicle cover, then a part of rainwater flows along the side wall of the connecting board 12, a part of rainwater in the above part of rainwater falls off from the connecting board 12 after flowing for a slight distance, and the falling rainwater does not fall on the mounting boards 22. The residual rainwater continues to flow downwards, part of rainwater flows into the drain tanks 21 and is directly drained by the drain tanks 21, also a part of rainwater flows to the mounting boards 22, since the vehicle is frequently turned in a driving process, before turning, the speed of the vehicle drops, at this point, the rainwater on the mounting boards 22 continues to move to the transition portions 8 due to the gravity per se, then the vehicle is turned, and in this process, the rainwater on the transition portions 8 moves to a direction to the turning direction, and thus moves to the bottoms of the drain tanks 21. After turned, the vehicle is accelerated, at this point, the rainwater at the bottoms of the drain tanks 21 fast flows on the bottoms of the drain tanks 21 till dripping from the opening ends of the drain tanks 21. The whole draining process is very fast, and the rainwater is prevented from being accumulated on the mounting boards 22 and in the drain tanks 21.

When the rainwater permeates into the cover bodies 31, the rainwater is accumulated between the first ridges 6 and the cover bodies 31 at first, due to this part of water, the water outside the cover bodies 31 is inhibited from flowing into the cover bodies 31 to some degree, and a part of this part of water is shunted to the outside the cover bodies 31. In the turning process, the rainwater between the first ridges 6 and the cover bodies 31 will flow to the gaps 9 between the first ridges 6 and the second ridges 7 along the slopes of the first ridges 6, when the rainwater in the gaps 9 becomes more and more, as the second ridges 7 are higher than the first ridges 6, the space between the first ridges 6 and the cover bodies 31 is filled with the rainwater when the water in the gaps 9 is more enough, and more rainwater is further prevented from entering the cover bodies 31.

The present embodiment merely explains the present invention rather than limiting the present invention, those skilled in the art can make amendments without creative contribution to the present embodiment according to needs after reading the description, and the amendments are protected by the patent law as long as in the scope of claims of the present invention.

What is claimed is:

1. A vehicle cover decoration strip comprising a decoration strip body (1) connected to a vehicle cover, characterized in that the decoration strip body (1) is provided with a placing board (2), and the placing board (2) is at least provided with a lighting device (3) downward irradiating a vehicle front;
wherein said lighting device comprises bottom boards (32) allowing light to transmit through, cover bodies (31) covering the bottom boards (32) and LED lamps (5) between the cover bodies (31) and the bottom boards (32), the bottom boards (32) being concave projecting downward to form grooves (321) for placing the LED lamps (5), the bottom boards (32) being provided with first ridges (6) extending to form closing structures along the edges of the cover bodies (3) and capable of abutting against the inner walls of the cover bodies (31), and second ridges extending to form closed structures along the edges of the first ridges (6) disposed on the bottom boards (32), the second ridges (7) being located between the first ridges (6) and the LED lamps (5) and gaps (9) exist between the first ridges (6) and the second ridges (7).

2. The vehicle cover decoration strip according to claim 1, characterized in that the placing board (2) comprises a plurality of mounting boards (22) for mounting the lighting device (3) and drain tanks (21) located between every two adjacent mounting boards (22), and one end of the drain tanks (21) forms an opening backing onto the decoration strip body (1).

3. The vehicle cover decoration strip according to claim 2, characterized in that the bottoms of the drain tanks (21) are downwardly inclined and the depth of the drain tanks (21) with respect to one end of the placing board (2) is smaller than the depth of the opening ends of the drain tanks (21).

4. The vehicle cover decoration strip according to claim 2, characterized in that the joints between the mounting boards (22) and the decoration strip body (1) are provided with transition portions (8) of which the bottoms are in smooth connection to the bottoms of the drain tanks (21).

5. The vehicle cover decoration strip according to claim 1, characterized in that press boards (4) are disposed in the cover bodies (31), which abut the LED lamps (5) in the grooves (321) by the press boards (4).

6. The vehicle cover decoration strip according to claim 1, characterized in that the second ridges (7) are higher than the first ridges (6) and the sectional shapes of the first ridges (6) along the height direction thereof are triangular.

7. The vehicle cover decoration strip according to claim 1, characterized in that the decoration strip body (1) comprises an arc connecting board (2) and a fixing board (11) attached to the vehicle cover, the fixing board (11) and the placing board (2) are respectively fixedly disposed at two ends of the connecting board (12) and are located at the same side of the connecting board (12), and a projection of the connecting board (12) on the plane where the placing board (2) is can cover the placing board (2).

* * * * *